2,779,780

1,4-DIAMINO-2,3-DICYANO - 1,4-BIS(SUBSTITUTED MERCAPTO) BUTADIENES AND THEIR PREPARATION

William J. Middleton, Wilmington, Del., assignor to E. I. du Pont de Nemours and Company, Wilmington, Del., a corporation of Delaware No Drawing. Application March 1, 1955,
Serial No. 491,512

25 Claims. (Cl. 260—465)

This invention relates to new substituted butadienes and to their preparation. More particularly, this invention relates to new substituted butadienes containing a plurality each of amino, cyano and organic substituted mercapto groups and to methods for their preparation.

In recent years considerable emphasis has been placed on butadiene and simple substituted butadienes as polymerizable monomers. However, little interest has been attached to substituted butadienes which normally are not copolymerizable. Heretofore, butadienes having a plurality each of amino, cyano and substituted mercapto or thio groups have not been reported.

It is an object of this invention to provide new substituted butadienes and processes for their preparation. A further object is to provide new substituted butadienes containing a plurality each of amino, cyano and organic substituted mercapto or thio groups and methods for their preparation. A still further object is to provide useful products which are derivatives of tetracyanoethylene or tetracyanoethane. Other objects will appear hereinafter.

These and other objects of this invention are obtained by providing substituted butadienes in which each of the central carbon atoms of the butadiene nucleus bears a cyano group and each of the terminal carbon atoms of the butadiene nucleus bears an amino group and an organic substituted mercapto group. These new substituted butadienes are generally white and crystalline in form. By substituted mercapto group is meant the group RS— wherein R is an organic radical which is substituted for the hydrogen of the mercapto group HS—. Thus, the substituted mercapto group includes hydrocarbonmercapto or hydrocarbonthio, such as alkylmercapto or alkylthio, arylmercapto or arylthio, monohydroxyhydrocarbonmercapto or monohydroxyhydrocarbonthio, such as monohydroxyalkylmercapto or monohydroxyalkylthio and monohydroxyarylmercapto or monohydroxyarylthio, and monoaminohydrocarbonmercapto or monoaminohydrocarbonthio such as monoaminoalkylmercapto or monoaminoalkylthio and monoaminoarylmercapto or monoaminoarylthio.

The new compounds of this invention are 1,4-diamino-2,3 - dicyano - 1,4 - bis(substituted mercapto)butadienes and are obtained by the reaction of tetracyanoethylene or tetracyanoethane with a mercaptan. These substituted butadienes have no hydrogen on carbon of the butadiene nucleus and have the general formula $$\begin{array}{c} \text{NC} \quad \text{CN} \\ | \quad | \\ \text{H}_2\text{N}-\text{C}=\text{C}-\text{C}=\text{C}-\text{NH}_2 \\ | \quad | \\ \text{R}-\text{S} \quad \text{S}-\text{R} \end{array}$$

wherein R is an organic radical, preferably of 1 to 10 carbon atoms. The preferred products include those wherein R is hydrocarbon, particularly aryl and alkyl, and monosubstituted hydrocarbon radicals, such as hydroxyalkyl, hydroxyaryl, aminoalkyl and aminoaryl, particularly of 1 to 10 carbon atoms, and preferably of 1 to 6 carbon atoms.

The preparation of the new compounds of this invention involves the reaction of tetracyanoethane or tetracyanoethylene with an excess of a monomeric mercaptan in the presence of a basic material as catalyst.

The following examples, in which the parts are by weight, illustrate specific embodiments of this invention.

EXAMPLE I

*1,4-diamino-2,3-dicyano-1,4-bis(beta-hydroxyethylmercapto)butadiene*

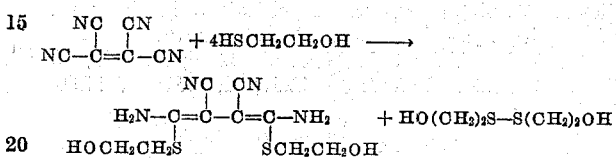

A solution of 12.8 parts of tetracyanoethylene in 55 parts of acetone was mixed with a solution of 2 parts of triethylamine in about 30 parts of beta-mercaptoethanol. The resultant solution was cooled in an icebath for ten minutes, and then poured into 1000 parts of water. After standing at room temperature for about one hour, the crystalline precipitate which formed was collected on a filter, washed with water, and dried. There was obtained 22.5 parts (81% yield) of 1,4-diamino-2,3 - dicyano - 1,4 - bis(beta-hydroxyethylmercapto)butadiene in the form of long, white, highly refractive needles, M. P. 176–177° C.

*Anal.*—Calcd. for $C_{10}H_{14}N_4O_2S_2$: C, 41.94; H, 4.95; N, 19.57; S, 22.39. Found: C, 42.04; H, 5.02; N, 19.57, 19.49; S, 22.28.

The infrared spectrum had bands at 2.93, 2.98 and 3.07$\mu$ for $NH_2$ and OH, and at 4.6$\mu$ for conjugated CN.

When the above procedure was repeated except that pyridine, as well as N-ethylpiperidine, were separately used as catalysts in place of the triethylamine, the same product was obtained.

EXAMPLE II

*1,4-diamino-2,3-dicyano-1,4-bis-(ethylmercapto)butadiene*

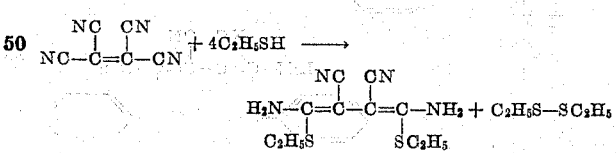

A solution of 1.28 parts of tetracyanoethylene in 4 parts of acetone was mixed with 2.5 parts of ethyl mercaptan. The reaction mixture was cooled in an icebath for five minutes, and 10 parts of 10% sodium hydroxide solution was added. The solution was diluted with water, and the white precipitate which formed was collected on a filter, washed with water, and recrystallized from ethyl alcohol. There was obtained 0.5 parts of 1,4 - diamino - 2,3 - dicyano - 1,4 - bis(ethylmercapto)butadiene in the form of white needles, M. P. 162–163° C.

*Anal.*—Calcd. for $C_{10}H_{14}N_4S_2$: C, 47.22; H, 5.55; N, 22.07; S, 25.21. Found: C, 47.34, 47.31; H, 5.60, 5.67; N, 22.14, 22.06; S, 25.26.

This same product was also obtained when pyridine was used as a catalyst in place of the sodium hydroxide in the above procedure.

EXAMPLE III

*1,4-diamino-2,3-dicyano-1,4-bis(methylmercapto)butadiene*

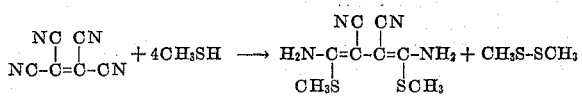

Methyl mercaptan gas was bubbled into a cooled solution of 12.8 parts of tetracyanoethylene in 80 parts of acetone until the volume of the solution had increased about 25%. Two hundred parts of 10% sodium hydroxide solution was added to the solution. The white precipitate which formed upon standing was collected on a filter, washed with water, and then dried. There was obtained 19.5 parts (86% yield) of 1,4-diamino-2,3-dicyano-1,4-bis(methylmercapto)butadiene in the form of a white crystalline powder, M. P. 190–192° C.

*Anal.*—Calcd. for $C_8H_{10}N_4S_2$: C, 42.46; H, 4.45; N, 24.76; S, 28.33. Found: C, 42.57; H, 4.61; N, 24.60, 24.45; S, 27.75.

EXAMPLE IV

*1,4-diamino-2,3-dicyano-1,4-bis(ethylmercapto)butadiene*

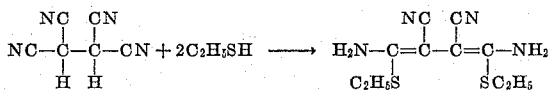

A solution of 6.5 parts of tetracyanoethane in 15 parts of acetone was mixed with a solution of 12.6 parts of ethyl mercaptan in 50 parts of 10% sodium hydroxide solution. The solution was allowed to stand at room temperature overnight. The long crystals which formed were collected on a filter, washed with water, and recrystallized from alcohol. There was obtained 5.1 parts of 1,4 - diamino - 2,3 - dicyano - 1,4 - bis(ethylmercapto)butadiene in the form of white needles, M. P. 162–163° C. A mixed melting point of this material and the material prepared from the reaction of tetracyanoethylene and ethyl mercaptan (Example II) was not depressed.

EXAMPLE V

*1,4-diamino-2,3-dicyano-1,4-bis(phenylmercapto)butadiene*

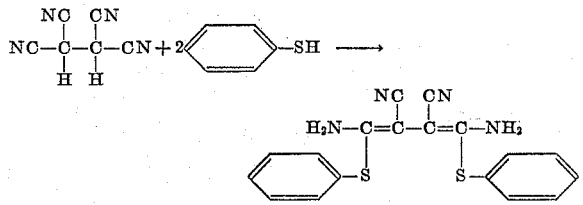

A solution of 6.5 parts of tetracyanoethane in 15 parts of acetone was added to a mixture of 22.0 parts benzenethiol and 50 parts of 10% sodium hydroxide solution. The reaction mixture became warm. After the reaction mixture had cooled to room temperature it was poured into 200 parts of water. The light yellow oil which separated solidified upon standing. The solid was collected on a filter, washed with water, and dried. There was obtained 12.3 parts (70% yield) of 1,4-diamino - 2,3 - dicyano-1,4-bis(phenylmercapto)butadiene in the form of a very light yellow powder. This material was recrystallized from ethyl alcohol to give white prisms, M. P. 150° C.

*Anal.*—Calcd. for $C_{18}H_{14}N_4S_2$: C, 61.69; H, 4.03; N, 15.99; S, 18.30. Found: C, 61.49; H, 4.30; N, 16.01, 16.19; S, 18.18.

EXAMPLE VI

*1,4-diamino-2,3-dicyano-1,4-bis(o-aminophenylmercapto)butadiene*

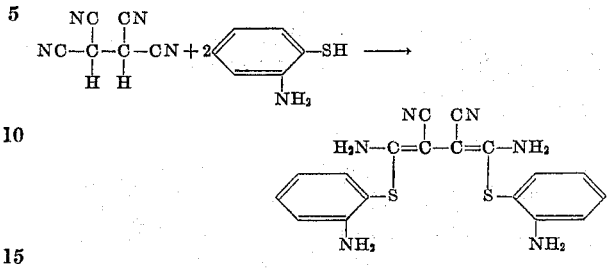

A solution of 6.5 parts of tetracyanoethane in 15 parts of acetone was mixed with a mixture of 25.0 parts of o-aminobenzenethiol in 50 parts of 10% sodium hydroxide. The oil which separated solidified to form a light yellow solid upon standing. The solid was collected on a filter, washed with water, and recrystallized from ethyl alcohol. There was obtained 16.0 parts of 1,4 - diamino - 2,3 - dicyano - 1,4 - bis(o-aminobenzenemercapto)butadiene in the form of white needles, M. P. 166–170° C. Further recrystallization from alcohol produced white needles, M. P. 172–173° C. The product contained one molecule of ethyl alcohol of crystallization per molecule of butadiene, as indicated by its elemental and spectral analysis.

*Anal.*—Calcd. for $C_{18}H_{16}N_6S_2 \cdot C_2H_5OH$: C, 56.31; H, 5.20; N, 19.70; S, 15.03. Found: C, 56.53; H, 5.05; N, 19.81, 19.92; S, 15.31.

The tetracyanoethylene in Examples I to III was prepared as disclosed in Cairns and Graef U. S. patent application Serial No. 382,842, filed September 28, 1953, by reaction of sulfur monochloride with malononitrile as in the following procedure:

Sulfur monochloride (70 parts) was added slowly during the course of six hours to a refluxing solution of 33 parts of malononitrile in about 600 parts of chloroform. After the mixture refluxed for an additional 20 hours, the chloroform was removed by heating on a steam bath. The crystalline residue was extracted with diethyl ether in a Soxhlet extractor. Evaporation of the ether extract gave crude tetracyanoethylene which was further purified by sublimation at 100° C. under a pressure of 1–2 mm.

The tetracyanoethane employed in Examples IV to VI was obtained as disclosed in Heckert U. S. patent application Serial No. 421,977, filed April 8, 1954, now abandoned, of which Serial Number 496,329, filed March 23, 1955, is a continuation-in-part, by reduction of tetracyanoethylene, e. g., a solution of 19.2 parts of tetracyanoethylene in about 60 parts of acetone was cooled in an ice bath and about 30 parts of mercaptoacetic acid added. The white needles were recrystallized from acetone/water solution to give pure tetracyanoethane.

In addition to the compounds described in the examples, the following are further illustrative of compounds included in this invention: 1,4-diamino-2,3-dicyano-1,4-bis(naphthylmercapto)butadiene, 1,4 - diamino-2,3-dicyano-1,4-bis(cyclohexylmercapto)butadiene, 1,4-diamino-2,3 - dicyano - 1,4 - bis(alpha - amino-beta-naphthylmercapto)butadiene, 1,4-diamino-2,3-dicyano-1,4-bis(alpha-hydroxy-beta-naphthylmercapto)butadiene, 1,4-diamino-2,3 - dicyano-1,4-bis(p-chlorophenylmercapto)butadiene, 1,4 - diamino - 2,3 - dicyano - 1,4 - bis(p-nitrophenylmercapto)butadiene, and 1,4-diamino-2,3-dicyano-1,4-bis(2-chloroethylmercapto)butadiene. These compounds include substituted butadienes of this invention which contain nitrohydrocarbonmercapto, such as nitroarylmercapto, and haloalkylmercapto substituents on the terminal carbon atoms of the butadiene nucleus.

These new substituted butadienes are obtained by the reaction of tetracyanoethylene or tetracyanoethane with a monothiol, i. e., a monomercaptan, in the presence of a base or a basic catalyst. The mercaptans required as reactants to obtain the above substituted butadienes are respectively naphthyl mercaptan, cyclohexyl mercaptan, alpha-amino-beta-naphthyl mercaptan, alpha-hydroxy-beta-naphthyl mercaptan, p-chlorophenyl mercaptan, p-nitrophenyl mercaptan and 2-chloroethyl mercaptan.

As described previously, tetracyanoethylene is prepared by the reaction of sulfur monochloride on malononitrile. In general, tetracyanoethane is obtained by the reduction of tetracyanoethylene. In view of the extra step involved in the manufacture of tetracyanoethane, it is generally preferred to use tetracyanoethylene in the reaction with the monothiol.

The mercaptan compounds that are useful are those which are monomeric and preferably have only one thiol or mercaptan, —SH, group. In general, the monomercaptans have from 1 to 10 carbons. Particularly useful are the hydrocarbon thiols such as methyl mercaptan, isopropyl mercaptan, butyl mercaptan, octyl mercaptan, cyclohexyl mercaptan, and naphthyl mercaptan. Also useful are monomercaptans which have a further non-reactive substituent such as halogen, hydroxy, nitro or amino groups. The latter type includes the mercaptonaphthols, aminonaphthylthiols, beta-aminoethylmercaptan, beta-chloroethylmercaptan, nitroarylthiols, and chloroarylthiols. Mercaptans containing heterocyclic groups, e. g., 2- or 4-mercaptopyridine and 2-mercaptobenzothiazole, are also useful. The particularly preferred mercaptans contain 1 to 6 carbons.

The mercaptan is generally employed in an amount which on a molar basis is greater than that of the tetracyanoethylene or tetracyanoethane. The reaction involves the transformation of two of the cyano groups to amino groups through a reduction. When tetracyanoethylene is used as a reactant, the mercaptan is employed usually in an amount of four times on a molar basis of the tetracyanoethylene. With tetracyanoethane, the reaction itself formally requires the reaction of two moles of mercaptan to one of the tetracyanoethane. Although the molar ratio can depart from these figures, it is generally preferred that the reactants be present in the approximate ratios described above for reasons of economy.

It is necessary that the reaction be carried out in the presence of a base or basic catalyst. Useful bases are those which have a basicity equivalent corresponding to an ionization constant greater than $1 \times 10^{-10}$. Suitable bases are amines, particularly water-soluble tertiary amines, and inorganic bases such as aqueous solutions of alkali metal hydroxides and carbonates, e. g., potassium carbonate and potassium hydroxide.

Since the catalyst is not invloved in the reaction product, it is not essential that it be present in large amounts. In general, the base is present in amounts of from 1–100% or more of the tetracyano compound employed.

The reaction takes place at room temperature although temperatures of below 0° C. to 50° C. or higher can be used. The time required may be only a few minutes, but generally times of the order of an hour to a day or more are employed.

Non-reactive solvents are useful to dissolve the tetracyano compound and mercaptan. The solvents useful are those which dissolve the reactants and form a homogeneous solution with them and any added basic catalyst. It is also preferred that the solvent is water soluble since the product of the reaction is insoluble in water and separates when the reaction mixture is diluted with water.

The new 1,4 - diamino - 2,3-dicyano-1,4-bis(substituted mercapto)butadienes are strong chelating agents. They react in solution with metals such as copper in copper acetate to remove the metal ions from solution. The new compounds of this invention are also useful as developers of photographic film. The compounds of this invention also have utility as intermediates, for example, they may be cyclized by the use of mineral acid to form heterocyclic compounds. The new compounds of this invention react with formaldehyde to form resins and these resins can be used in place of or in conjunction with such resinous materials as the urea-formaldehyde condensation products for the same purposes, such as to form molded objects.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A substituted butadiene having the general formula

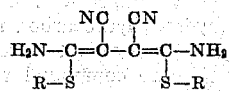

wherein R is a radical of not more than ten carbon atoms selected from the class consisting of hydrocarbon, monohydroxyhydrocarbon, monoaminohydrocarbon, mononitrohydrocarbon and monohalohydrocarbon radicals.

2. A substituted butadiene in which each of the central carbon atoms of the butadiene nucleus bears a cyano group and each of the terminal carbon atoms of the butadiene nucleus bears an amino group and a hydrocarbon substituted mercapto group of not more than ten carbon atoms.

3. A substituted butadiene in which each of the central carbon atoms of the butadiene nucleus bears a cyano group and each of the terminal carbon atoms of the butadiene nucleus bears an amino group and a monohydroxyhydrocarbon substituted mercapto group of not more than ten carbon atoms.

4. A substituted butadiene in which each of the central carbon atoms of the butadiene nucleus bears a cyano group and each of the terminal carbon atoms of the butadiene nucleus bears an amino group and a monoaminohydrocarbon substituted mercapto group of not more than ten carbon atoms.

5. A substituted butadiene in which each of the central carbon atoms of the butadiene nucelus bears a cyano group and each of the terminal carbon atoms of the butadiene nucleus bears an amino group and an alkylmercapto group of not more than ten carbon atoms.

6. A substituted butadiene in which each of the central carbon atoms of the butadiene nucelus bears a cyano group and each of the terminal carbon atoms of the butadiene nucleus bears an amino group and an arylmercapto group of not more than ten carbon atoms.

7. A substituted butadiene in which each of the central carbon atoms of the butadiene nucleus bears a cyano group and each of the terminal carbon atoms of the butadiene nucelus bears an amino group and a monohydroxyalkylmercapto group of not more than ten carbon atoms.

8. A substituted butadiene in which each of the central carbon atoms of the butadiene nucleus bears a cyano group and each of the terminal carbon atoms of the butadiene nucleus bears an amino group and a monoaminoarylmercapto group of not more than ten carbon atoms.

9. 1,4 - diamino-2,3-dicyano-1,4-bis(methylmercapto)-butadiene.

10. 1,4 - diamino - 2,3-dicyano-1,4-bis(ethylmercapto)-butadiene.

11. 1,4 - diamino-2,3-dicyano-1,4-bis(phenylmercapto)-butadiene.

12. 1,4 - diamino-2,3-dicyano-1,4-bis(beta-hydroxyethylmercapto)butadiene.

13. 1,4 - diamino - 2,3-dicyano-1,4-bis(o-aminophenylmercapto)butadiene.

14. Process for preparing substituted butadienes which comprises reacting in contact with a basic catalyst, a tetracyano compound selected from the class consisting of tetracyanoethane and tetracyanoethylene with a monomeric mercaptan having only one —SH group to which is attached a radical of not more than ten carbon atoms selected from the class consisting of hydrocarbon, monohydroxyhydrocarbon, monoaminohydrocarbon, mononitrohydrocarbon and monohalohydrocarbon radicals.

15. Process for preparing substituted butadienes which comprises reacting in contact with a basic catalyst, a monomeric hydrocarbon mercaptan having only one —SH group and of not more than ten carbon atoms with a tetracyano compound selected from the class consisting of tetracyanoethane and tetracyanoethylene.

16. Process for preparing substituted butadienes which comprises reacting in contact with a basic catalyst, a monomeric monohydroxyhydrocarbon mercaptan having only one —SH group and of not more than ten carbon atoms with a tetracyano compound selected from the class consisting of tetracyanoethane and tetracyanoethylene.

17. Process for preparing substituted butadienes which comprises reacting in contact with a basic catalyst, a monomeric monoaminohydrocarbon mercaptan having only one —SH group and of not more than ten carbon atoms with a tetracyano compound selected from the class consisting of tetracyanoethane and tetracyanoethylene.

18. Process for preparing substituted butadienes which comprises reacting in contact with a basic catalyst, a monomeric alkyl mercaptan having only one —SH group and of not more than ten carbon atoms with a tetracyano compound selected from the class consisting of tetracyanoethane and tetracyanoethylene.

19. Process for preparing substituted butadienes which comprises reacting in contact with a basic catalyst, a monomeric aryl mercaptan having only one —SH group and of not more than ten carbon atoms with a tetracyano compound selected from the class consisting of tetracyanoethane and tetracyanoethylene.

20. Process for preparing substituted butadienes which comprises reacting in contact with a basic catalyst, a monomeric monohydroxyalkyl mercaptan having only one —SH group and of not more than ten carbon atoms with a tetracyano compound selected from the class consisting of tetracyanoethane and tetracyanoethylene.

21. Process for preparing 1,4-diamino-2,3-dicyano-1,4-bis(methylmercapto)butadiene which comprises reacting in contact with a basic catalyst, methyl mercaptan with a tetracyano compound selected from the class consisting of tetracyanoethane and tetracyanoethylene.

22. Process for preparing 1,4-diamino-2,3-dicyano-1,4-bis(ethylmercapto)butadiene which comprises reacting in contact with a basic catalyst, ethyl mercaptan with a tetracyano compound selected from the class consisting of tetracyanoethane and tetracyanoethylene.

23. Process for preparing 1,4-diamino-2,3-dicyano-1,4-bis(phenylmercapto)butadiene which comprises reacting in contact with a basic catalyst, benzenethiol with a tetracyano compound selected from the class consisting of tetracyanoethane and tetracyanoethylene.

24. Process for preparing 1,4-diamino-2,3-dicyano-1,4-bis(beta-hydroxyethylmercapto)butadiene which comprises reacting in contact with a basic catalyst, beta-mercaptoethanol with a tetracyano compound selected from the class consisting of tetracyanoethane and tetracyanoethylene.

25. Process for preparing 1,4-diamino-2,3-dicyano-1,4-bis(o-aminophenylmercapto)butadiene which comprises reacting in contact with a basic catalyst, o-aminobenzenethiol with a tetracyano compound selected from the class consisting of tetracyanoethane and tetracyanoethylene.

No references cited.